United States Patent [19]

Kaiser

[11] 4,455,224

[45] Jun. 19, 1984

[54] APPARATUS FOR TREATING A PAPERMAKING SUSPENSION

[75] Inventor: Robert G. Kaiser, Seminole, Fla.

[73] Assignee: Clark & Vicario Corporation, Pinellas Park, Fla.

[21] Appl. No.: 21,623

[22] Filed: Mar. 19, 1979

[51] Int. Cl.³ .............................................. B04C 5/28
[52] U.S. Cl. .................................. 209/211; 210/512.2
[58] Field of Search ................... 209/211; 210/512 M; 55/41, 194, 202-204, 184, 185, 192; 52/40, 73; 220/1 B

[56] References Cited

U.S. PATENT DOCUMENTS

| | | | |
|---|---|---|---|
| 2,462,101 | 2/1949 | Horton | 220/1 B |
| 2,567,958 | 9/1951 | Mummert | 52/40 X |
| 2,912,074 | 11/1959 | Gram | 52/40 |
| 3,101,313 | 8/1963 | Woodruff | 209/211 |
| 3,432,036 | 3/1969 | Kaiser | 55/41 X |
| 3,538,680 | 11/1970 | Kaiser | 55/41 |
| 3,812,007 | 5/1974 | Kaiser | 209/211 X |
| 3,959,123 | 5/1976 | Wikdahl | 209/211 |
| 4,148,721 | 4/1979 | Brown et al. | 209/211 |

Primary Examiner—F. W. Lutter
Assistant Examiner—Wm. Bond
Attorney, Agent, or Firm—Vogt & O'Donnell

[57] ABSTRACT

Apparatus for treating a papermaking suspension which includes an elevated receiver mounted at the top of a pedestal structure, there being a plurality of generally vertically oriented cleaners connected at the underside of the receiver and the pedestal structure providing conduit means through which the suspension to be cleaned is conveyed to the cleaners, rejected stock from the cleaners being returned to a subsequent cleaning operation and through which cleaned deaerated stock can be conveyed from the receiver to a point of use such as a papermaking machine.

4 Claims, 25 Drawing Figures

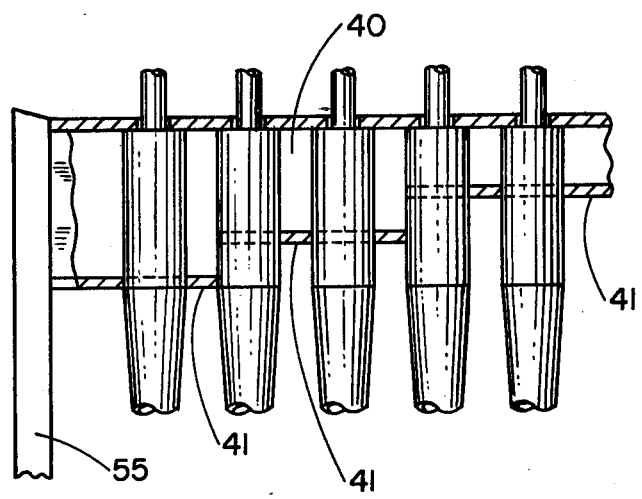
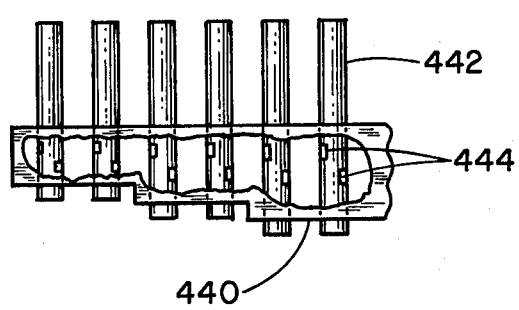
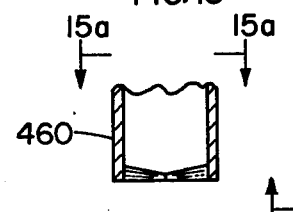
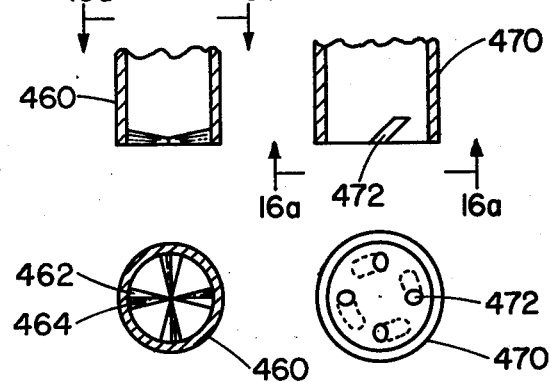
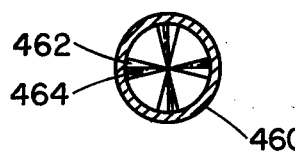
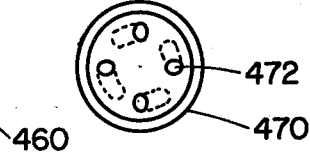
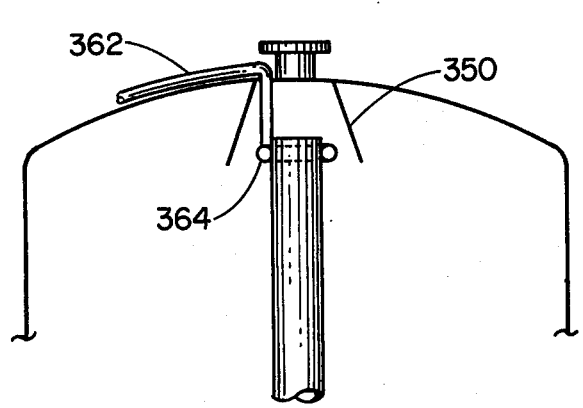
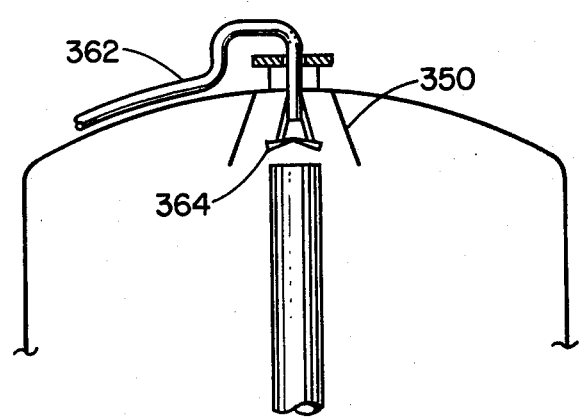

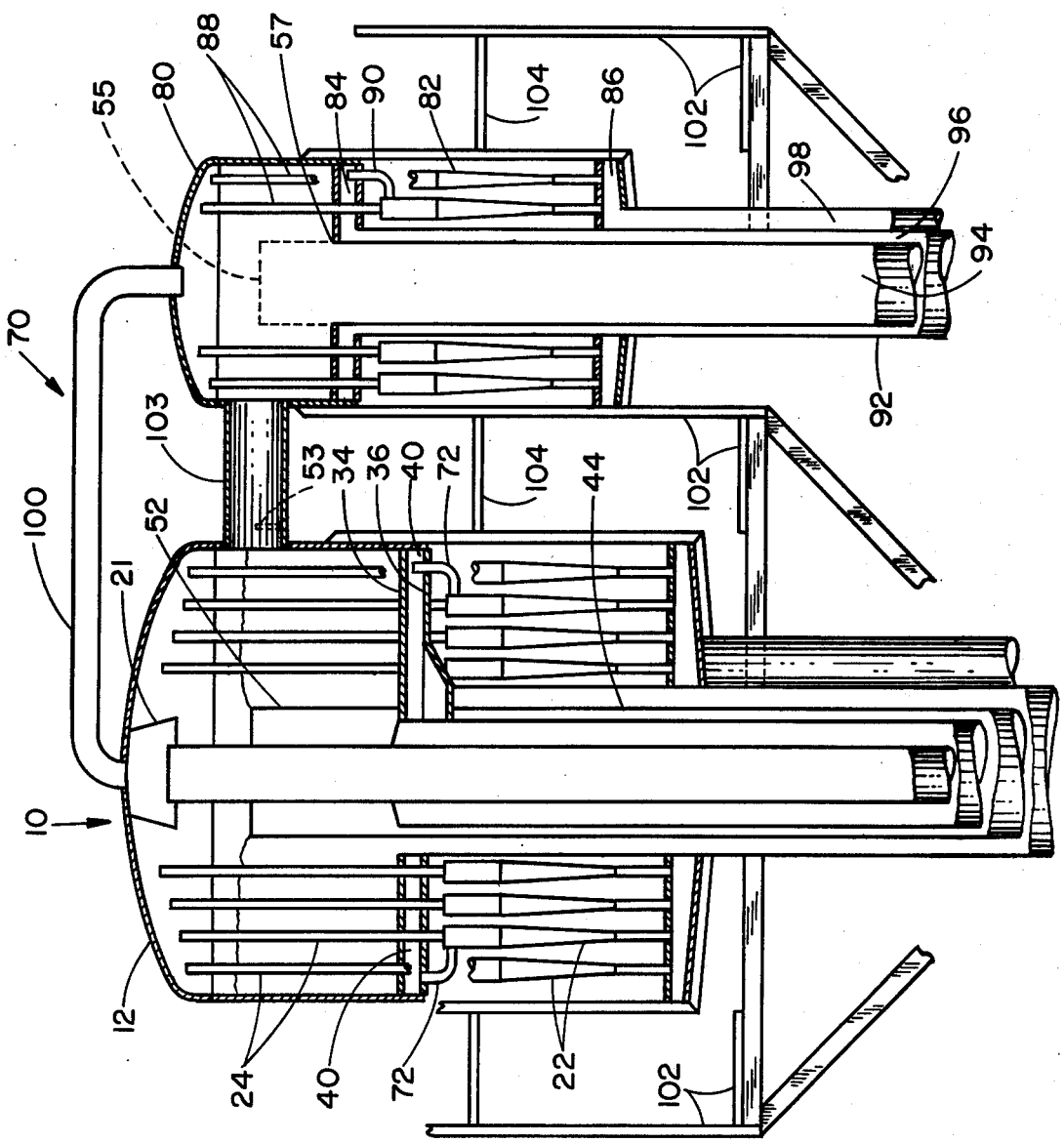

APPARATUS FOR TREATING A PAPERMAKING SUSPENSION

BACKGROUND OF THE INVENTION

This invention relates to apparatus for treating suspensions and more particularly relates to apparatus for treating suspensions of papermaking stock prior to delivery of such stock to a point of use, e.g., a papermaking machine.

The current trend in the papermaking industry is in the direction of larger and higher operating speed systems. As machine size and speed increases, it becomes necessary to provide a larger number of small cleaners in the system to classify or clean the papermaking stock before it is delivered to the paper forming machine. Desirably, such stock also is subjected to a deaeration operation generally concurrent with the cleaning operation since as is well known, deaeration contributes considerably to the quality of the formed paper product. Representative of apparatus involving both cleaning and deaeration is the disclosures of U.S. Pat. Nos. 3,432,036; 3,538,680 and 3,720,315. However, the requirement for providing additional numbers of cleaners in a papermaking system also presents the problem of increased energy demand for operating the cleaners particularly with respect to overcoming the frictional losses encountered in supplying feed from a source of stock to and through the cleaners. Moreover, there is the problem associated with where such cleaners conveniently can be mounted in the system, i.e., the availability of such additional space in the mill as is required to allow for mounting or integrating the cleaners within the system. Furthermore, where a great number of cleaners are employed in a papermaking system, the need to conveniently and quickly remove defective or plugged cleaners from the system places a limitation on the manner in which such cleaners can be mounted on or adjacent to a central stock collection receiver into which is feeding accepted stock discharge from the cleaner units.

Canister arrangements or close grouping of cleaners in a system are known in the prior art. However such cleaners are not arranged in the natural attitude for such cleaning, i.e., in a generally vertical positioning. Instead, cannister cleaners are arranged in a horizontal attitude as, for example, in the fashion of the spokes of a wheel. Thus such cleaners are not self-draining and during system shutdown stock lays in the cleaners with the consequence that fiber builds up in the cleaners to the disadvantage that such condition promotes cleaner clogging when the system is restarted.

Each of the problems and circumstances above enumerated are ameliorated by the present invention, as will be apparent from the description which follows.

SUMMARY OF THE INVENTION

The present invention relates to apparatus for treating papermaking stock prior to the delivery of the stock to a point of use, such use being invariably a paperforming machine. In particular, it involves apparatus for cleaning and deaerating such stock. The apparatus as will be discerned from the description to be given in detail later, can involve a primary, a secondary, a tertiary stage of cleaning or such further cleaning stage operation as may be desirable while readily allowing for incorporation of such cleaning stages containing large numbers of cleaners in the apparatus of the invention.

The apparatus of the invention is characterized by its optimized utilization of available space for the cleaning purposes involved, is relatively inexpensive to erect as compared with known systems, involves reduction in the amount of power required for operation of the apparatus, particularly by elimination of piping associated with the cleaners and cleaning operation, and by reason of its including a vacuum deaeration tank, facilitates achieving pressure drop across the cleaners with reduced energy consumption. Furthermore, the apparatus eliminates and simplifies piping requirements thereby reducing installation requirements and costs. Indeed, the apparatus is such that it readily can be in most instances shop fabricated and shipped as a newly completed structure to the mill in which the apparatus is to be installed. By employing what is effectively a free standing tower structure the apparatus eliminates much of the reinforcement heretofore required for supporting stock receivers in mill mezzanines.

In accordance with the present invention, the apparatus for treating papermaking stock includes an enclosed receiver or tank which is mounted in an elevated position at the top of a pedestal unit. The elevated stock receiver includes an enclosure defining space in which a pond of deaerated cleaned papermaking stock can be collected, and connected at the tank is a plurality of cleaner units arranged in generally vertical orientation, that is, their upper or accepts ends are disposed to discharge dirt-poor fractions therefrom in an upward generally vertical discharge course. Representative of the type of cleaners that can be employed in the apparatus are those described in U.S. Pat. No. 2,377,524. The advantage of employing the cleaners in a side-by-side generally vertical array is that they are positioned in their natural orientation to take advantage of the effect of the force of gravity in discharging rejects therefrom. An overflow control can be provided in the receiver to regulate the level of the pond of stock collecting therein which is particularly efficacious in respect of the stabilization of papermaking system operations such constant head level of stock providing advantages are set forth in U.S. Pat. No. 3,206,917. An advantage of the present invention is that the cleaners are mounted at the elevated stock receiver in a manner as provides ready access for quick removal and replacement of the cleaners. Thus, the cleaner body need not extend into the tank receiver but rather such cleaners can be mounted at the bottom of the tank receiver and inlet pipes connected to the outlet ends of the cleaners deliver the deaerated stock into the receiver chamber.

The pedestal structure on which the receiver component is mounted can be provided in the form of a plurality of concentric pipes, each enclosing a space serving a different function as will be explained, but which pipes are joined together as a unitary structure usually located centrally of the receiver to provide a supporting pedestal component for the tank receiver. Individual pipes also could be clustered together, and in another pedestal form, certain of the pipes could be arranged at the periphery of the receiver. Extending laterally at the bottom of the receiver there is branch feed conduit means such as a feed plenum which is employed to deliver papermaking stock to the inlet openings of the cleaners. Such plenum can employ the bottom of the receiver as one space enclosing surface and include a plate spaced some distance below as an opposite enclosure with there being an encircling wall at the exterior of the receiver defining the outer end enclosure for the plenum. Further, the plenum can be stepped down or of diminishing cross-section in the direction away from entry of stock thereto to insure maintenance of flow velocity at requisite levels in the plenum particularly at locations most remote from where the stock enters the plenum. Spaced below the stock receiver chamber and encircling the pedestal structure, there is provided a rejects compartment to which the rejects ends of the respective cleaners discharge rejected or dirty stock. The pedestal as indicated may comprise a series of concentric pipes extending the full height thereof and which are each associated with supply or withdrawal of stock either cleaned or uncleaned from the cleaners and/or receiver as well as a conduit for placing the top of the stock receiver under a deaerating level of vacuum. In one form, the centermost conduit in the pedestal can comprise the vacuum conduit with the next encircling pipe being capped at the top and enclosing a space for delivery of a feed of stock to the cleaner plenum, a next encircling pipe to provide outflow of any overflow of stock from the pond, a further pipe to define a conduit for conveying stock from the collection chamber to the papermaking machine, there being provided additionally, a conduit in the pedestal for conveying rejects to a subsequent stage of cleaning or such other point of use as may be involved in the operation of the system. As those skilled in the art will appreciate, the conduit arrangement can be varied as to which particular pipe performs what function. E.g., the vacuum conduit need not be the centermost conduit. Such centermost conduit could serve to convey deaerated cleaned stock to the point of use and one of the other pipes in the structure serve as the vacuum connection. Additionally, the pipes need not be concentric ones but could be merely clustered together individual pipe structures.

In a further form of the invention, a second tank receiver can be used in conjunction with the primary receiver and can have associated therewith its own separate pedestal structure, forming the conduits for feed to the second stage cleaners as well as for conveying rejected stock from the secondary cleaners to a further cleaning operation and a collection conduit for conveying the cleaned stock from the secondary tank receiver to the feed stage of the primary tower. Additionally, the stock receivers of the first and second towers can be interconnected to allow for overflow from the primary tower to the secondary tower as a convenient way of preventing flooding of the primary tower when papermaking machine demand decreases.

The invention also provides that where primary and secondary cleaning operations are involved, the secondary receiver can be provided as part of a common shell structure with the primary receiver, as for example in the form of two circular sectioned receivers which intersect, the point of intersection demarking the flow through communication of the respective receiver structures.

Moreover, the invention readily lends itself to employing a number of primary stage cleaning receivers in conjunction with a single secondary cleaning operation receiver in which instance the primary receivers can be arranged in the fashion of satellites about the secondary receiver or a series of primary receivers can be interconnected in line one with the others and finally with the secondary receiver.

The invention also provides that a single receiver structure could be sub-divided to provide for both primary and secondary cleaning operations and tertiary cleaning and even further cleaning operations if desired within the same structure. In such case, one sector of the receiver could serve as secondary receiver space while the remaining sector would provide the primary receiver space. Further sector subdivision of the receiver could of course be employed in correspondence to the cleaning stages involved.

The invention accordingly comprises the apparatus embodying the features of construction, combination of elements and arrangement of parts, all as will be exemplified in the following detailed disclosure.

DESCRIPTION OF THE DRAWINGS

For a further understanding of the nature and objects of the invention, reference should be had to the following detailed description taken in conjunction with the accompanying drawings in which.

FIG. 1a is a fragmentary elevational view of the apparatus shown in FIG. 1 depicting a stepped or diminishing cross-section stock feed plenum.

FIG. 4 is a vertical schematic depiction of another form of tower apparatus constructed in accordance with the present invention wherein first and second stages of suspension are treated in respective primary and secondary tower units, such units being interconnected and disposed as a unitary structure.

FIGS. 4a and 4b are fragmentary vertical sectional figures depicting alternative means for controlling the pond levels in the primary and secondary towers shown in FIG. 4.

FIGS. 13a and 13b depict variations of shower devices located in the receiver headspace to reduce the vapor load to the vacuum producing means which maintains the receiver headspace under a deaerating condition of vacuum. FIG. 14a is a fragmentary side elevational view partly broken away depicting use of inlet pipes in the plenum of the FIG. 14 apparatus which extend fully vertically through the plenum and are provided with side wall inlets for entry of stock thereto. FIGS. 15 and 16 are fragmentary side elevational views of further forms of inlet pipes which can be used to impart swirling movement to the stock being sprayed, e.g., into the enclosed receiver shown in FIG. 14. FIGS. 15a and 16a are views taken along the respective lines 15a—15a and 16a—16a in FIGS. 15 and 16.

Throughout the description, like reference numerals are used to denote like parts in the drawings.

DESCRIPTION OF THE PREFERRED EMBODIMENTS

The present invention is concerned generally with improvements in papermaking systems and particularly in respect of incorporating large numbers of suspension centrifugal cleaners in a most economical, efficient and compact fashion. Moreover the cleaners are mounted in an array and with relationship to the other structural components of the apparatus as results in reduction of friction losses to a greater degree than heretofore with a resultant substantial savings in the amount of power required for supplying suspension to the cleaning operation. Further, the apparatus to be described is most economically erected and achieves installation savings not possible when installing large numbers of cleaners in manners and arrangements as heretofore known.

Figure 1:
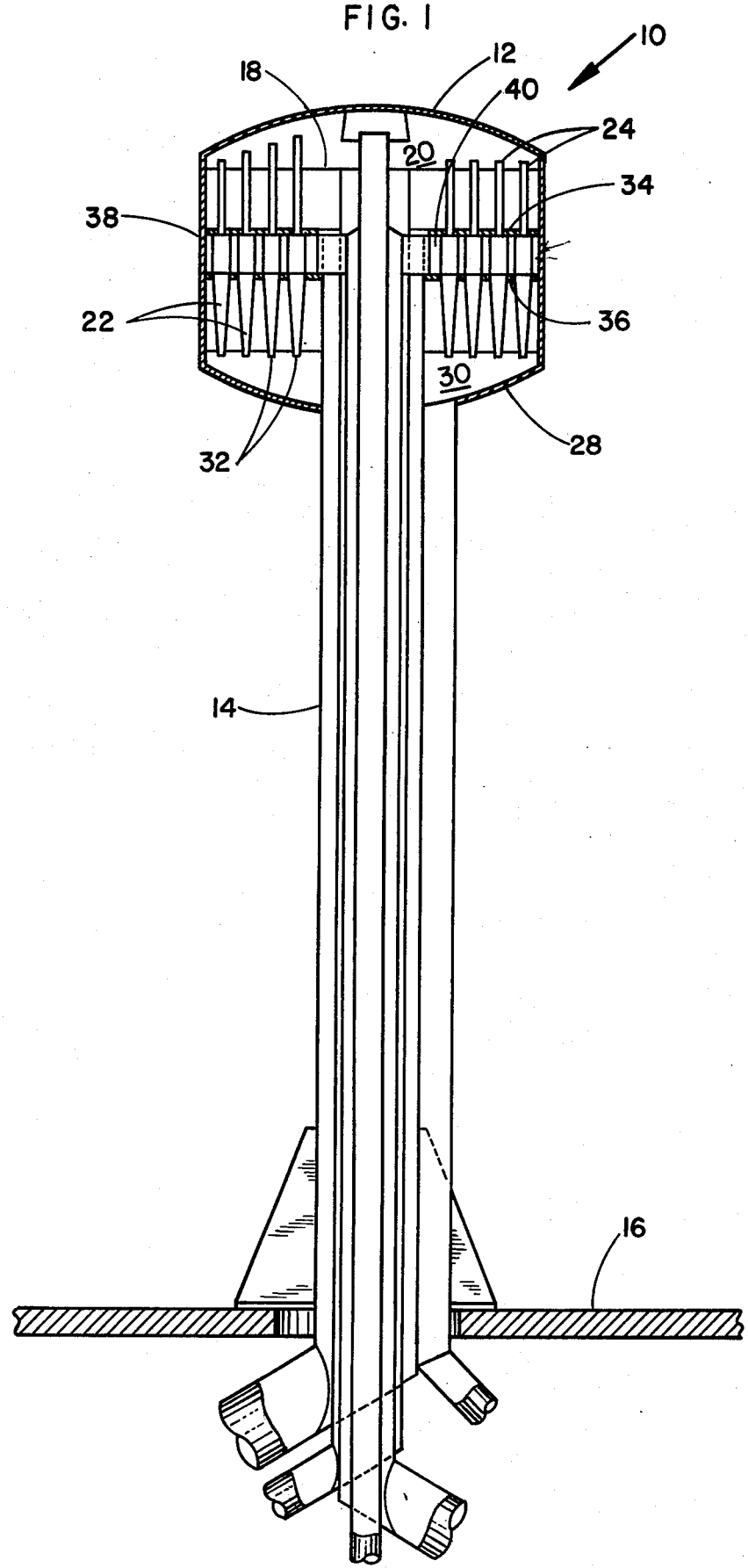
FIG. 1 is a vertical sectional view of one form of tower apparatus for treating a suspension in accordance with the present invention.
Figure 2:
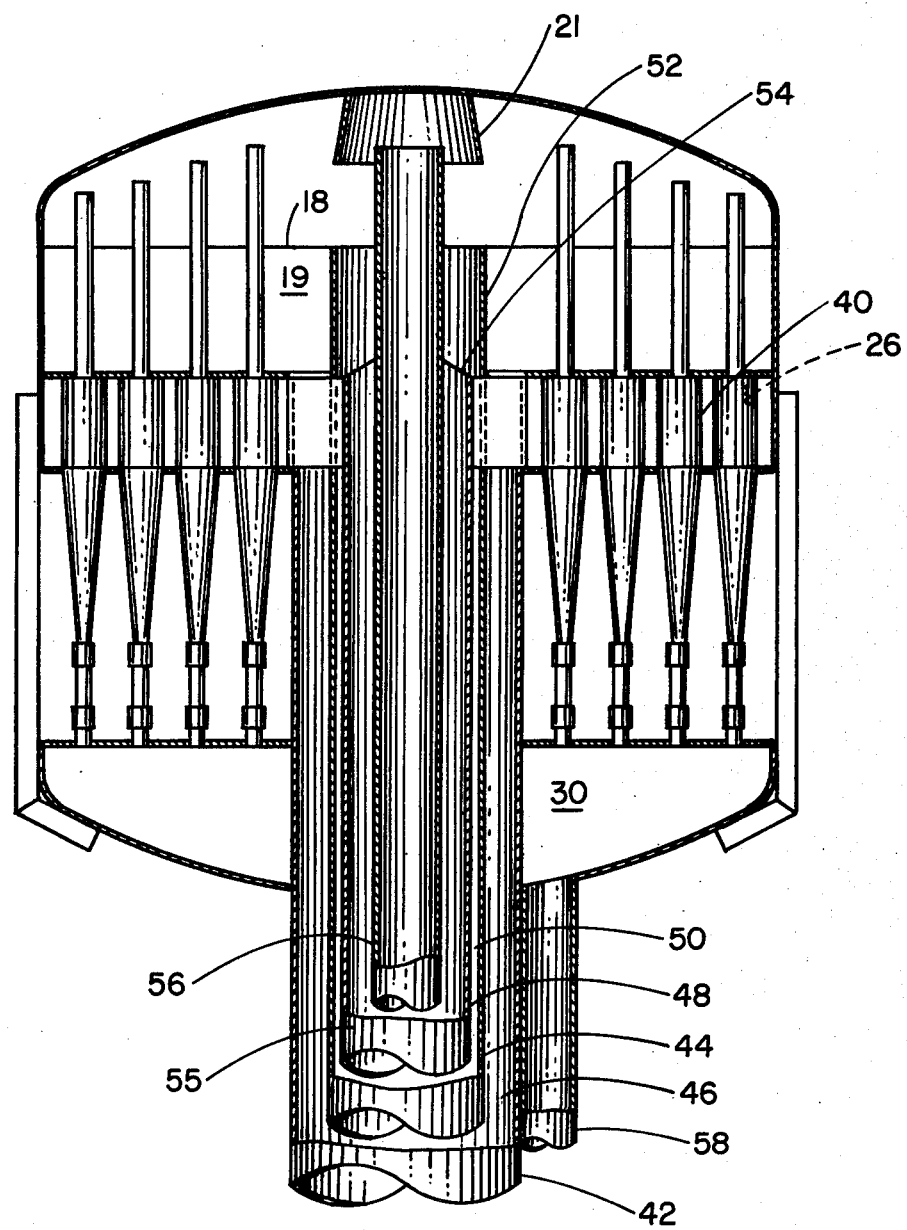
FIG. 2 is an enlarged view of the upper portion of the apparatus shown in FIG. 1.
Figure 3:
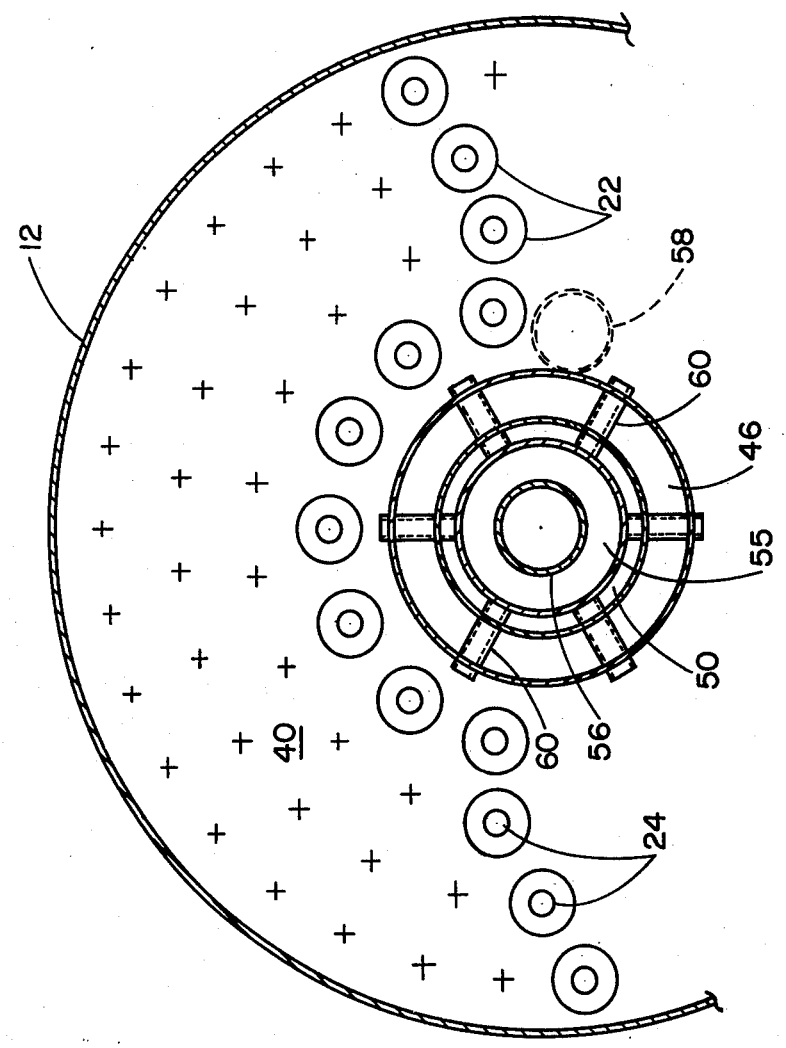
FIG. 3 is a partial horizontal sectional view of the apparatus shown in FIG. 2, depicting the manner of arraying the feed cleaners in the tower receiver.

Referring now to FIGS. 1-3 of the drawings, there is shown one form 10 of apparatus of the present invention. The apparatus 10 is associated with a primary stage cleaning operation, i.e., it is used for cleaning and deaerating papermaking suspension with the cleaned, deaerated portion being passed directly from the cleaning operation to the papermaking machine. Apparatus 10 includes a stock receiver 12 which is mounted at the top of a pedestal structure 14, the receiver desirably being located above the mill floor 16 at a distance such that the later to be discussed overflow or level 18 (FIG. 2) in the receiver is at a height sufficient to have gravity outflow from the receiver to a desired end point in the papermaking process. Similarly, outflow of rejects from the rejects collection chamber will be determinative height at which the receiver is elevated as such rejects also gravity flow to a silo, wire pit or seal box. In practice the pond level 18 and/or level in the rejects collection chamber will be 34-35 feet or more above the level in the silo, wire pit or seal box. The stock receiver 12 is a shell structure which encloses a space 20 into which suspension dirt-poor fraction is sprayed from the cleaners 22, the stock entry from the dirt-poor outlets of the cleaners being by means of accepts pipes 24 which sprayingly impinges the stock against the underside of the receiver top wall to enhance deaeration of the stock in the headspace of the receiver which is maintained under a deaerating level of vacuum. The primary cleaners 22 are provided in numbers in accordance with the size of the system and in the depicted embodiment total 94 in number. The cleaners 22 are arranged in an array about the expanse of the plan outline of the receiver and are disposed in a natural, i.e., generally vertical attitude with the dirt-poor outlets oriented to discharge cleaned stock vertically upwardly. The cleaners it will be noted do not extend directly into the receiver compartment but rather are connected at the underside thereof which arrangement greatly facilitates access to the cleaners for removal of same in the event the cleaners need replacement and/or servicing. Each cleaner 22 is provided with one or more submerged inlet openings 26 (FIG. 2) by means of which stock is introduced into the cleaner. The depicted cleaners are side inlet cleaners although it will be understood that the invention is applicable to the use of top inlet cleaners as well. Various manners of connecting the cleaners to the receiver structure can be used e.g. those described in pending application Ser. No. 840,999 filed Oct. 10, 1977 now U.S. Pat. No. 4,146,469. Arranged at the bottom of the receiver and spaced a distance below receiver 12 and at the underside of the cleaners 22 is structure shown generally at 28 which forms a rejects chamber 30 and to which is connected the dirt-rich outlets 32 of the cleaners.

Spaced below the bottom wall 34 of the receiver is a lower head member 36 which together with bottom wall 34 and outer encircling wall 38 define cleaner branch feed conduit means, i.e., a plenum or feed chamber 40 for the cleaners, the cleaners being arranged such that the inlets 26 thereto are submerged in suspension fed into the plenum, the plenum extending radially of the pedestal structure 14, such arrangement being best seen from FIGS. 2 and 3.

The pedestal structure 14 can be disposed in one advantageous form, generally centrally of the receiver 12 rejects chamber 30 and serves in addition to being a supporting structure, as a conduit structure housing the various conduits associated with the cleaning operation. In a particularly advantageous form, the conduits are defined by a concentric series of pipes extending the full height of the pedestal and as will be described next. Pipe 42 together with pipe 44 encloses an annular space defining conduit 46 which is connected with the space in receiver 12 for conveying cleaned deaerated suspension from the pond to a point of use, e.g., the papermaking machine. The upper end of pipe 44 it will be noted may extend upwardly a distance in the receiver so as to provide an overflow or level control in the form of a circular weir 52 to maintain a constant level 18 of suspension in the pond 19. Pipe 44 together with pipe 48 in turn define conduit 50 communicating with the other side of the weir 52 and employed to convey overflow from the receiver pond to a point of use, e.g., recycle to the primary cleaning stage, the upper end of pipe 48 being provided with a cap 54 to block off the top of the next innermost conduit. Such next innermost conduit 55 defined by pipes 48 and 56 is used for supplying a feed of suspension to the centrifugal cleaners and more particularly to plenum or feed chamber 40. Pipe 56, the innermost one in the arrangement is connected to a deaerating source of vacuum and a spray baffle 21 is provided to prevent intake of fibers from the receiver head space to the vacuum conduit. Rejects or dirt-rich stock collecting in rejects chamber 30 is conveyed through pipe conduit 58 connected to the side of the concentric pipe array to a point of use, e.g., a secondary cleaning operation. As can be best seen in FIG. 3, feed from conduit 55 is passed to plenum 40 by means of radial feed pipes 60. It will be appreciated that the various conduits just discussed also could in lieu of concentric pipes be individual pipes clustered together as a generally centralized bundle of pipes below the receiver.

FIG. 1a depicts a plenum 40 of diminishing or stepped down cross-section and provided such as to maintain requisite velocity levels in the stock flowing to the cleaners at locations remote from where the stock entered the plenum from conduit 55, the plenum being stepped as at 41. Maintenance of proper velocity of flow is important to prevent floccing, stagnation or fiber settlement in the plenum and cleaners and ultimately the plugging of the cleaners, proper velocity of flow also serving to keep free air out of the plenum headspace by effecting purging of same from the headspace.

Figure 2A:
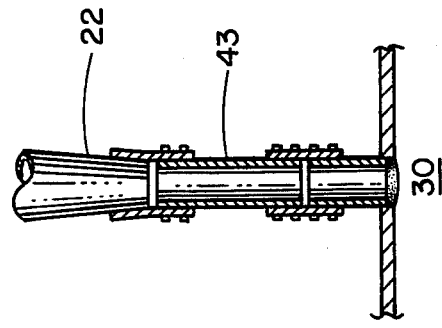
FIG. 2a is a fragmentary elevational view of the dirt-rich discharge end of the cleaner employed in the apparatus of FIG. 2 showing a transparent sight tube connecting the said cleaner end to the rejects collection chamber.

FIG. 2a depicts a transparent sight glass 43 which is used to connect the rejects ends of the cleaners to the rejects collection chamber 30. By reason of the character of the rejects observed as passing through the sight glass, the operating condition of the cleaner can be judged. In other words, the spiral flow course of the rejects issuing from a cleaner can be observed in flow to ascertain operating condition by viewing the entire flow pattern—such capability not being possible where only a view plate is provided as in certain types of prior installations, e.g., cannister type units as exemplified in U.S. Pat. Nos. 3,261,467 and 3,959,123.

FIG. 4 shows a further form of apparatus 70 which is employed for plural cleaning stage operation and more particularly for primary and secondary cleaning stage operation. Such apparatus includes a primary stage section 10 which is substantially like that depicted in FIGS. 1-3 and for such reason the same reference numerals are applied to common structure. However in section 10, the centrifugal cleaners 22 do not have their inlet openings 26 submerged in plenum 40. Instead, pipes 72 are used to connect the inlets to the plenum. Further, the pipes 24, 72 pass through lower head member 36 and bottom wall 34 to thereby enhance the plenum structural character and also to maintain the parallel disposition of the cleaners. Apparatus 70 also includes a secondary receiver 80, cleaners 82, plenum 84, rejects chamber 86, inlet pipes 88, pipes 90 connected to the cleaner inlet, and a separate pedestal structure 92 for supporting the secondary receiver, all such components functioning in the same manner as the comparable devices and structure in the first stage except the end purpose of the secondary cleaning in this embodiment is to provide second stage dirt-poor suspension recycled feed to the first stage cleaners. Pedestal structure 92 is defined by pipes which provide an outlet conduit 94 for outletting stock from receiver 80, a conduit 96 for supplying feed to the plenum, and a conduit 98 connected to the rejects chamber 86. A deaerating condition of vacuum is maintained in the headspace of the secondary receiver by means of a vacuum connector pipe 100 which connects such headspace to the headspace in receiver 12, which function could be provided by tunnel 103 as well. While both receivers are free standing being supported by their respective pedestal structure, the receivers are provided additionally with structural members as shown generally at 102, 104 serving to provide a catwalk, and service platform. Overflow from the pond in receiver 12 outflows therefrom through tunnel 103 to receiver 80, the lower side of the tunnel being below the level of the weir in receiver 10. While the level of pond in receiver 12 is shown as being maintained by means of a weir 52 therein, the level could be just as easily controlled by placing a weir 53 in tunnel 103 as shown in FIG. 4a. Moreover, the level also could be controlled by a weir 55 formed by extending pipe 57 in receiver 80 upwardly a distance as shown in FIG. 4b and thus eliminating weirs 52 and 53. In fact, various combinations of level controls are provided in receivers 12 and/or 80. Thus pipe 44 could be shortened, weir 53 eliminated and level control be provided with the floor of tunnel 103 in which case weir 55 desirably would be at the level of the floor. Alternatively, weir 53 could be eliminated as well as weir 52 and level control be provided by weir 55 alone.

FIG. 4 shows the vacuum conduit which is used to maintain the vacuum in the headspace of the two receivers as extending upwardly into receiver 12. Such conduit could of course be placed in the pedestal piping structure of receiver 80 instead.

While the receivers in FIG. 4 are both free standing structures, it will be appreciated that guy wires and the like could be employed to strengthen and stabilize the erected structures.

Figure 5B:
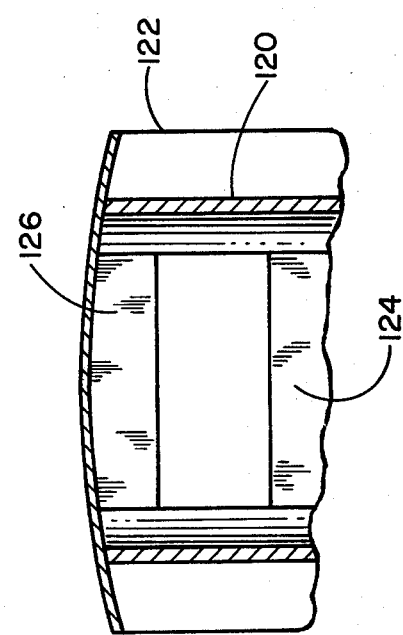
FIG. 5b is a fragmentary elevational view showing the weir disposed between the primary and secondary receivers of the FIG. 5 apparatus for effecting pond level control in the primary receiver.
Figure 5A:
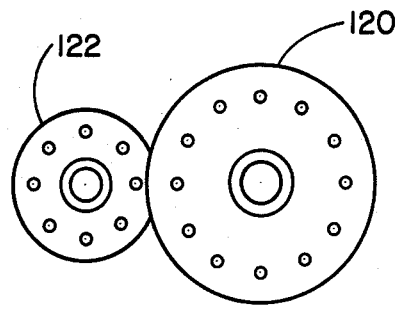
FIG. 5a is a schematic top plan view of the apparatus shown in FIG. 5.
Figure 5:
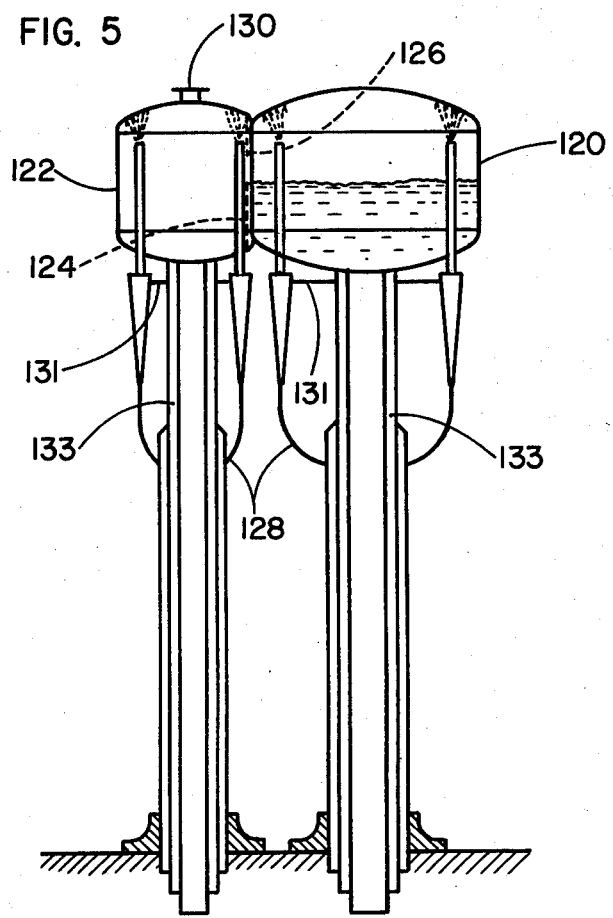
FIG. 5 is a schematic vertical view showing still another form of tower apparatus employed for primary and secondary cleaning operations, but wherein the stock receivers of the respective primary and secondary cleaning stages are formed as a common shell structure.

FIGS. 5 and 5a show a further embodiment of the invention where primary and secondary stages are employed in the cleaning operation. In such embodiment, the respective receivers 120, 122 are encircling shell structures which intersect and where they intersect they are fixed one to the other as in a gas tight joint, there being an opening communicating the interiors of the receivers at the intersection. An overflow device or weir 124 is as best seen in FIG. 5b, disposed at the opening to maintain a pond level within the primary receiver 120, and a baffle 126 separates the two headspaces. Further in such embodiment, the dirt-rich suspension or rejects issuing from the respective cleaner stages can be conveyed directly to pedestal conduits as at 128 without passing through any intervening rejects chamber. Additionally, feed to the cleaner instead of being from a plenum can be by means of branch pipes 131 connected to feed supply conduits 133. Moreover, the vacuum connection to the receiver headspaces can be as at 130, an arrangement not employing a conduit in the pedestal structure for such purpose.

Figure 6:
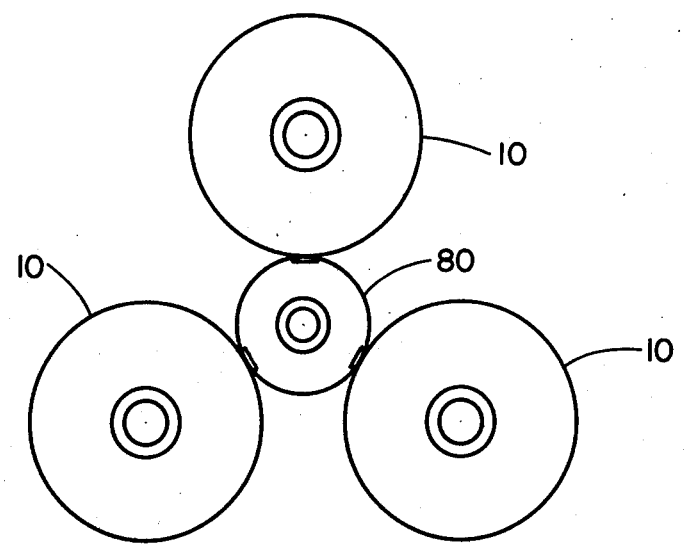
FIGS. 6 and 7 are schematic depictions in plan view of variations in the tower apparatus wherein one or more cleaning stage tank receivers are arranged in satellite series connected configuration.
Figure 7:
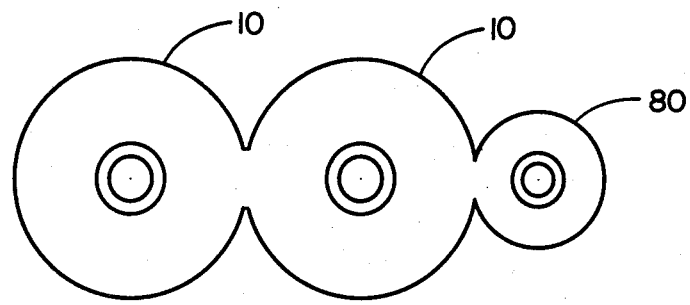

FIGS. 6 and 7 depict further variation in receiver arrangements wherein primary and secondary receivers are used and in particular where two or more primary receivers 10 are used with a single secondary receiver 80 in which case, the primary receivers can be disposed in satellite, circularly spaced disposition relative to the secondary receiver (FIG. 7) or a primary receiver could serve as the central component with the other primary receivers and a secondary receiver in series side-by-side relationship therewith.

Figure 9:
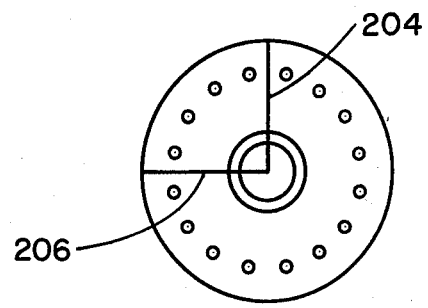
FIGS. 8 and 9 are respectively, vertical and horizontal schematic depictions of a tower unit in which a single receiver is provided with two separate receiver sectors for separate primary and secondary cleaning stage operations.
Figure 8:
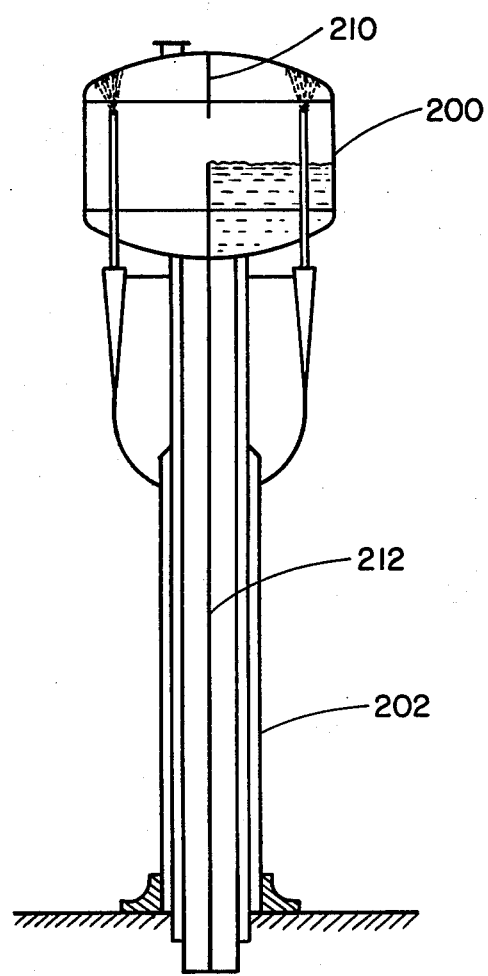

FIGS. 8 and 9 show another arrangement of primary and secondary cleaning apparatus, but wherein a single receiver structure 200 and single pedestal structure 202 serves for both cleaning stages. To provide such capacity, receiver 200 is subdivided by weir plates 204, 206 to define a first receiver sector serving as the secondary receiver portion, whereas, the remainder receiver portion or sector serves as the primary receiver portion, with the respective cleaners of each stage being disposed to discharge dirt-poor suspension into the appropriate sector. A baffle 210 is provided at the underside of the receiver top wall to subdivide the head space in the same manner that the weir plates form two receiver sectors. The conduits in the pedestal structure are also subdivided by plates therein as at 212. Individual pipe clusters to and from each sector also could be provided in lieu of the encircling arrangement of pipes depicted.

Figure 10:
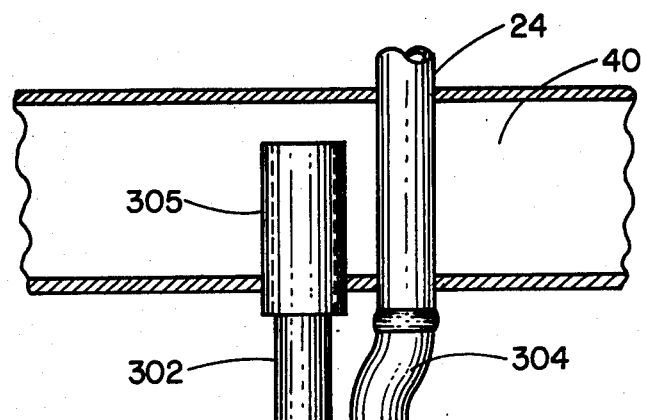
FIG. 10 is a fragmentary elevational view showing the manner of connecting a top inlet type cleaner with the stock feed plenum.
Figure 10A:
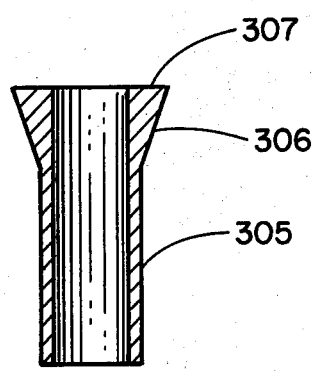
FIG. 10a is an elevational view depicting employment of a flared upper end inlet pipe in the plenum and connected to the cleaner shown in FIG. 10, the flaring being provided to prevent fiber hang up at the inlet pipe entry.

FIG. 10 shows the manner in which a top inlet cleaner 300 having both inlet 302 and outlet 304 therefrom at the top of the cleaner body is connected to plenum 40, a connector pipe 305 extending up into the plenum. FIG. 10a shows a variation in the construction of connector pipe 305 which is flared at the top or provided with a thickened tapering part as at 306 to thereby lengthen surface 307. Lengthened surface 307 is made, e.g., ⅜"–½" greater than the longest length of papermaking fiber to prevent such fibers from stapling on the entry to pipe 305 which would of course result in continued build-up if occurring and eventual problems in operation of the system.

Figure 11:
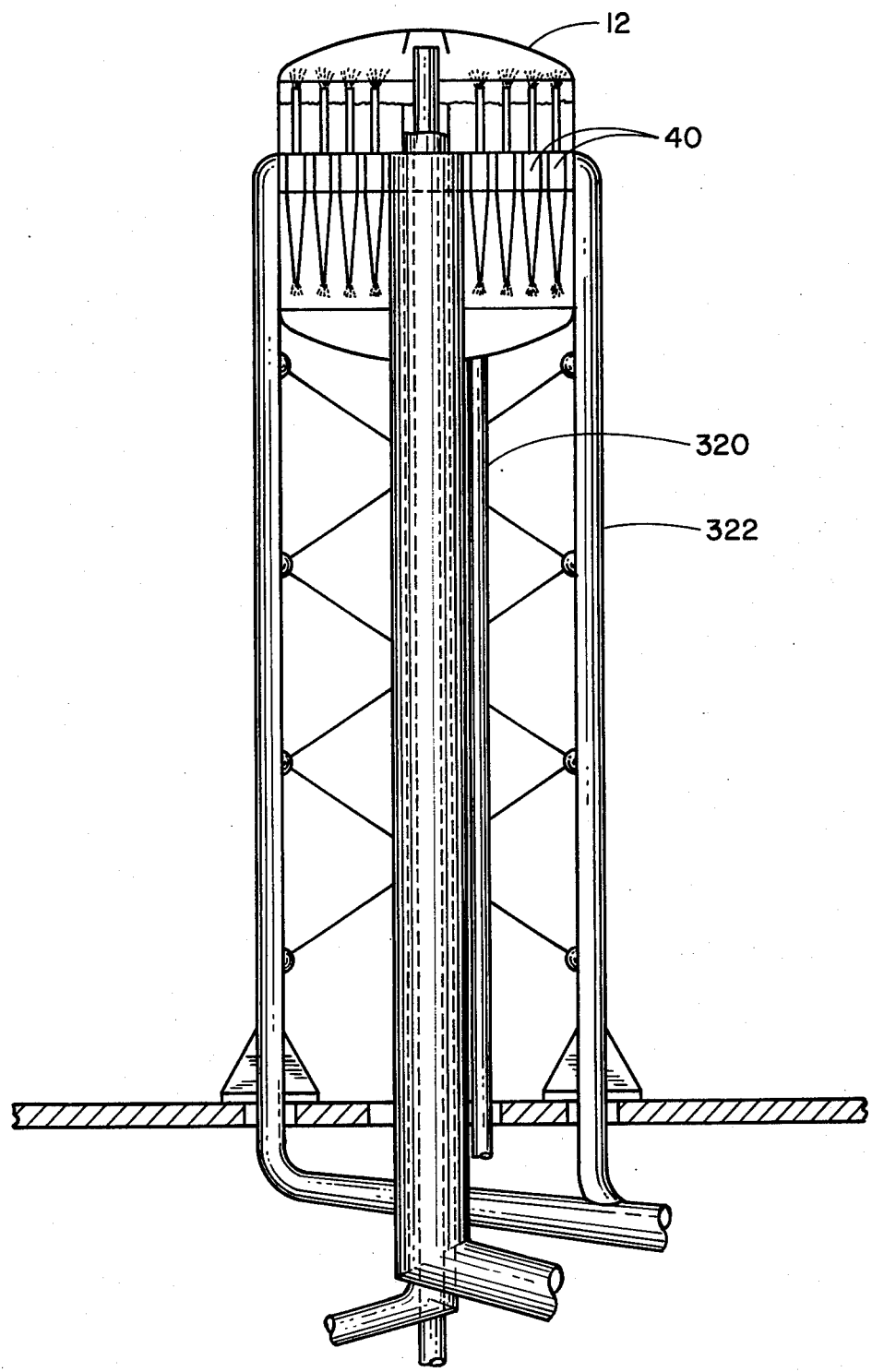
FIG. 11 is an elevational view of a further embodiment of tower apparatus in which the stock feed conduits forming part of the pedestal structure are disposed at the periphery of the receiver, the remaining pedestal conduits being located generally centrally of the receiver.

FIG. 11 shows a further embodiment of the lower apparatus in which the receiver 12 is supported at the top of pedestal structure which includes a central cluster of piping as at 320 and pipe conduits 322 disposed at the periphery of the receiver. The conduits 322 are employed to supply a feed of stock to the plenum 40 wherein the plenum does not have a stepped or diminishing cross-sectional configuration, with the feed pipes 322 being designed to be spaced around the periphery in numbers and at locations sufficient to insure an optimized and constant flow velocity in the stock fed to the plenum the feed being in random flow pattern radially inwardly from point of introduction. The particular embodiment also depicts the pipe conduits associated with conveying deaerated stock to a paper machine, that employed for conveying overflow to a recycle operation to the first stage cleaning operation and the conveyance of rejects to a point of use. A similar arrangement could be employed as the feed pipe means for feed supply to each secondary and/or tertiary sector plenum in the FIGS. 8 and 9 apparatus.

Figure 12:
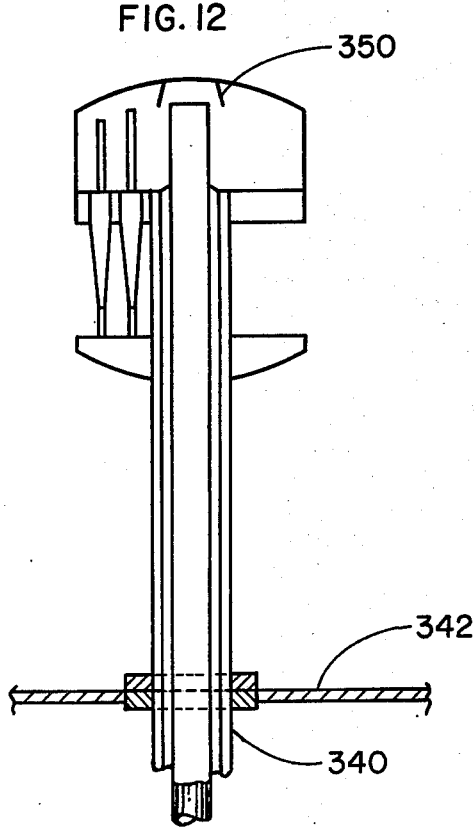
FIG. 12 is an elevational view of a further form of apparatus in which the pedestal structure is supported at the mezzanine floor of a mill or such other level in the mill convenient for effecting the installation.

FIG. 12 shows a further embodiment of apparatus of the present invention intended for use wherein the pedestal structure on which the receiver is supported is not free standing all the way to the mill floor or below. Rather the pedestal structure connected to the receiver is foreshortened and is connected to the mezzanine floor with the pedestal structure as at 340 continuing below the mezzanine floor but being unsupported below such mezzanine floor 342. Various arrangements of piping to and from the pedestal at the mezzanine floor are possible.

FIGS. 13a and 13b depict shower arrangements which can be employed in the headspaces of the receiver components. Thus, at the headspace there is a deflecting baffle 350 which is employed to prevent the sucking in of fibers to the vacuum outlet and also the employment of a shower pipe 362 and spray unit 364 which provides a continuous water spray in the region of entry to the vacuum outlet pipe. The purpose of employing such shower arrangement is to reduce the vapor load to the vacuum producing means.

Figure 14:
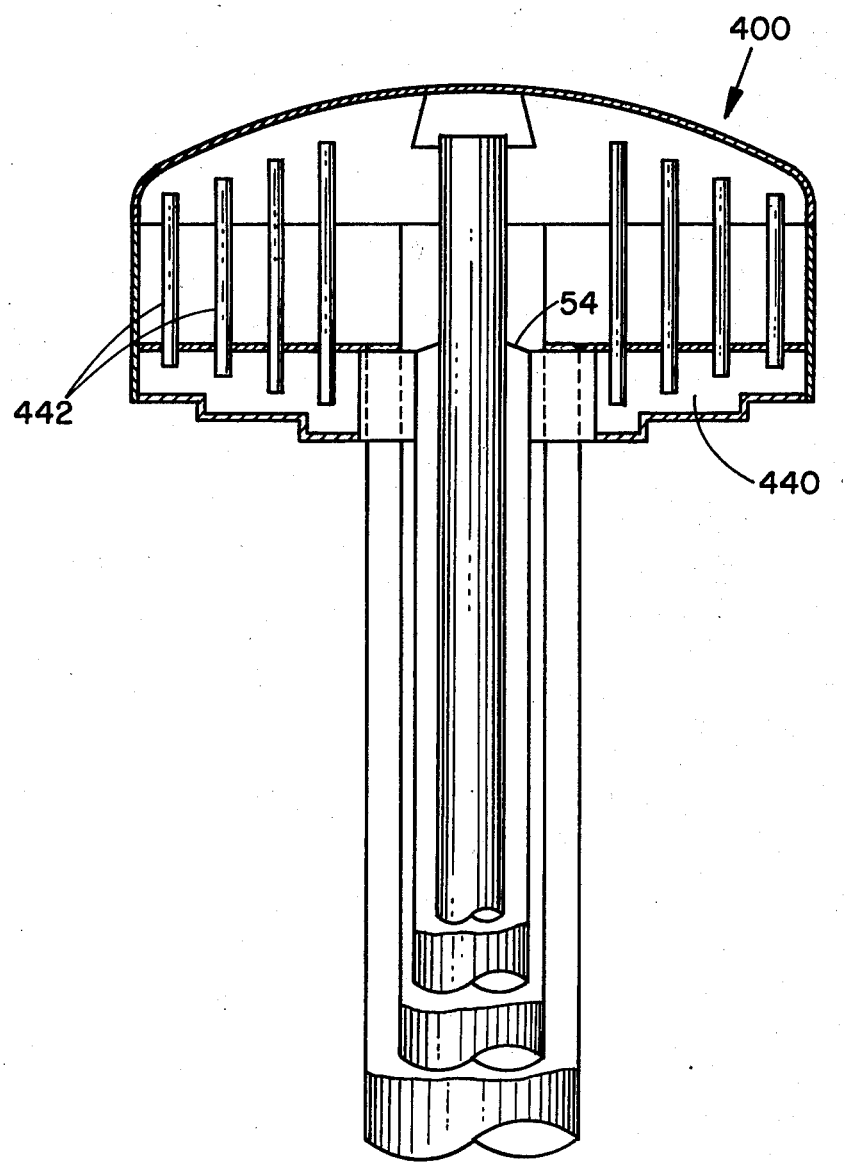
FIG. 14 is an elevational view of a further form of tower apparatus used in conjunction with a deaerating of papermaking suspension which has earlier been subjected to a cleaning operation.

FIG. 14 shows another form of apparatus 400 wherein cleaners are not employed to clean the stock, but rather the stock is cleaned in an earlier operation and thereafter introduced into the receiver 400 to deaerate same although post-deaeration cleaning also may be employed. The stock as in the embodiment depicted in FIG. 1 enters through plenum 440 and is sprayingly discharged through inlet pipes 442 into the space of the receiver. FIG. 14a shows a form of plenum 440 which can be used in apparatus 400 and wherein the inlet pipes 442 extend through the top and bottom of the plenum and are provided with inlets 444 in the pipe wall, such arrangement making it convenient to install the inlet pipes in a very simple fashion. The inlets can also be provided with inward or outwardly blending tabs to impart swirl to the flow, the tabs further being arranged in similar or different planes.

FIGS. 15, 15a, 16 and 16a depict an arrangement of inlet pipes which can be used in the FIG. 14 apparatus. These pipes are employed to impart to or enhance the spiralling or swirling movement the stock introduced into receiver 412 should have. The pipe 460 in FIGS. 15, 15a has an arrangement at the bottom at which an inclined surface 464 is adjacent openings 462 and which functions as a turning vane to swirl the stock. Pipes 470 in FIGS. 16, 16a are provided with circularly arranged tangential inlet and upwardly inclined passages 472 which accomplish the same purpose of swirling the stock.

While there is disclosed above but certain embodiments of the present invention, it will be appreciated that further modifications can be made therein without departing from the scope of the invention disclosed.

What is claimed is:

1. Apparatus for cleaning and deaerating an aqueous suspension of papermaking stock comprising
 a plurality of centrifugal cleaners for separating suspension into dirt-rich and dirt-poor fractions, each cleaner having separate outlets through which said dirt-rich and dirt-poor fractions discharge therefrom,
 an enclosed receiver for receiving and collecting the dirt-poor portions discharging from said cleaners,
 vertically elongated pedestal structure, said receiver being disposed at the top of said pedestal structure, said cleaners being disposed at the underside of said receiver and arranged in side-by-side parallel array one with the others, with the dirt-poor outlet of each cleaner disposed to provide vertical discharge of dirt-poor fractions therefrom, each cleaner having a top side inlet opening for introducing suspension into said cleaner,
 outlet pipe means connecting the dirt-poor discharge of said cleaner with said receiver, said pipe means terminating in an open end within said receiver above the level of any pond of suspension collecting therein,
 a plenum extending radially of said pedestal structure at the bottom of said receiver, the inlet openings of said cleaners being connected with said plenum by means of inlet pipes extending into said plenum, the heights of the inlet pipes extending into said plenum being varied to provide suspension flow access to such pipes at different levels above the bottom of said plenum thereby to inhibit existence of dead flow spaces and gas accumulation within said plenum, a source of vacuum, and means for connecting said source of vacuum with the head space in said receiver, dirt-poor suspension discharging into said head space being subjected to the influence of vacuum to effect deaeration of same, said pedestal structure comprising a plurality of conduits and including a conduit connected with said receiver for conveying dirt-poor suspension to a point of use, conduit means for supplying suspension to said plenum, and a conduit for conveying dirt-rich suspension to a subsequent cleaning operation, the dirt-rich outlets of said cleaners communicating with the last-mentioned conduit.

2. Apparatus for cleaning and deaerating an aqueous suspension of papermaking stock comprising a plurality of centrifugal cleaners for separating suspension into dirt-rich and dirt-poor fractions, each cleaner having separate outlets through which said dirt-rich and dirt-poor fractions discharge therefrom, an enclosed receiver for receiving and collecting the dirt-poor portions discharging from said cleaners, vertically elongated pedestal structure, said receiver being disposed at the top of said pedestal structure, said cleaners being disposed at the underside of said receiver and arranged in side-by-side parallel array one with the others, with the dirt-poor outlet of each cleaner disposed to provide vertical discharge of dirt-poor fractions therefrom, each cleaner having an inlet opening for introducing suspension into said cleaner, outlet pipe means connecting the dirt-poor discharge of said cleaners with said receiver, said pipe means terminating in an open end within said receiver above the level of any pond of suspension collecting therein, cleaner feed branch conduit means extending radially of said pedestal structure at the bottom of said receiver, the inlet openings of said cleaners being in communication with said feed branch conduit means, a source of vacuum, and means for connecting said source of vacuum with the head space in said receiver, dirt-poor suspension discharging into said head space being subjected to the influence of vacuum to effect deaeration of same, said pedestal structure comprising a plurality of conduits and including a conduit connected with said receiver for conveying dirt-poor suspension to a point of use, conduit means for supplying suspension to said cleaner feed branch conduit means, and a conduit for conveying dirt-rich suspension to a subsequent cleaning operation, the dirt-rich outlets of said cleaners communicating with the last-mentioned conduit, said receiver being a space encircling shell structure, some of the conduits in said pedestal structure being disposed in a cluster generally centrally of said shell structure, there further being conduits disposed at the periphery of said shell structure, the conduits disposed at the periphery of said shell structure being associated with supply of suspension to said cleaner feed branch means.

3. Apparatus for cleaning and deaerating an aqueous suspension of papermaking stock comprising a plurality of centrifugal cleaners for separating suspension into dirt-rich and dirt-poor fractions, each cleaner having separate outlets through which said dirt-rich and dirt-poor fractions discharge therefrom, an enclosed receiver for receiving and collecting the dirt-poor portions discharging from said cleaners, vertically elongated pedestal structure, said receiver being disposed at the top of said pedestal structure, said cleaners being disposed at the underside of said receiver and arranged in side-by-side parallel array one with the others, with the dirt-poor outlet of each cleaner disposed to provide vertical discharge of dirt-poor fractions therefrom, each cleaner having an inlet opening for introducing suspension into said cleaner, outlet pipe means connecting the dirt-poor discharge of said cleaners with said receiver, said pipe means terminating in an open end within said receiver above the level of any pond of suspension collecting therein, cleaner feed brach conduit means extending radially of said pedestal structure at the bottom of said receiver, the inlet openings of said cleaners being in communication with said feed branch conduit means, a source of vacuum, and means for connecting said source of vacuum with the head space in said receiver, dirt-poor suspension discharging into said head space being subjected to the influence of vacuum to effect deaeration of same, said pedestal structure comprising a plurality of conduits and including a conduit connected with said receiver for conveying dirt-poor suspension to a point of use, conduit means for supplying suspension to said cleaner feed branch conduit means, and a conduit for conveying dirt-rich suspension to a subsequent cleaning operation, the dirt-rich outlets of said cleaners communicating with the last-mentioned conduit, the means for connecting said source of vacuum with the receiver head space comprising a further separate pedestal structure conduit, said separate pedestal structure conduit comprising a pipe extending upwardly in said receiver and having termination in said head space, and a baffle carried in the head space of said receiver and encircling the terminus of said pipe to prevent entry of suspension solids into said terminus.

4. Apparatus for cleaning and deaerating an aqueous suspension of papermaking stock comprising a plurality of centrifugal cleaners for separating suspension into dirt-rich and dirt-poor fractions, each cleaner having separate outlets through which said dirt-rich and dirt-poor fractions discharge therefrom, an enclosed receiver for receiving and collecting the dirt-poor portions discharging from said cleaners, vertically elongated pedestal structure, said receiver being disposed at the top of said pedestal structure, said cleaners being disposed at the underside of said receiver and arranged in side-by-side parallel array one with the others, with the dirt-poor outlet of each cleaner disposed to provide vertical discharge of dirt-poor fractions therefrom, each cleaner having a top side inlet opening for introducing suspension into said cleaner, outlet pipe means connecting the dirt-poor discharge of said cleaners with said receiver, said pipe means terminating in an open end within said receiver above the level of any pond of suspension collecting therein, a plenum extending radially of said pedestal structure at the bottom of said receiver, the inlet openings of said cleaners being connected with said plenum by means of inlet pipes extending into said plenum, the entrace end of each inlet pipe being flared to provide a lengthened surface thereon in length in excess of any fiber lengths of the fiber contained in the suspension flowing in the plenum thereby to inhibit stapling of the fibers at said entrance, a source of vacuum, and means for connecting said source of vacuum with the head space in said receiver, dirt-poor suspension discharging into said head space being subjected to the influence of vacuum to effect deaeration of same, said pedestal structure comprising a plurality of conduits and including a conduit connected with said receiver for conveying dirt-poor suspension to a point of use, conduit means for supplying suspension to said plenum, and a conduit for conveying dirt-rich suspension to a subsequent cleaning operation, the dirt-rich outlets of said cleaners communicating with the last-mentioned conduit.

* * * * *

UNITED STATES PATENT AND TRADEMARK OFFICE
CERTIFICATE OF CORRECTION

PATENT NO. : 4,455,224
DATED : June 19, 1984
INVENTOR(S) : Robert G. Kaiser

It is certified that error appears in the above—identified patent and that said Letters Patent is hereby corrected as shown below:

Col. 6, line 34, insert a comma (,) after "used" and before "e.g.".

Col. 9, line 33, "lower" should read -- tower --.

Col. 13, line 14, Claim 4, "entrace" should read -- entrance --.

Signed and Sealed this

Twenty-third Day of October 1984

[SEAL]

Attest:

Attesting Officer

GERALD J. MOSSINGHOFF
Commissioner of Patents and Trademarks